(12) United States Patent
Hashimoto

(10) Patent No.: US 7,500,757 B2
(45) Date of Patent: Mar. 10, 2009

(54) PROJECTOR

(75) Inventor: Akira Hashimoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 483 days.

(21) Appl. No.: 11/360,421

(22) Filed: Feb. 24, 2006

(65) Prior Publication Data

US 2006/0197916 A1 Sep. 7, 2006

(30) Foreign Application Priority Data

Mar. 3, 2005 (JP) ............................. 2005-058518
Nov. 24, 2005 (JP) ............................. 2005-338275

(51) Int. Cl.
*G03B 21/18* (2006.01)
*G03B 21/16* (2006.01)
*G03B 21/26* (2006.01)
*H04N 5/74* (2006.01)

(52) U.S. Cl. ............................. 353/61; 353/57; 353/60; 348/748

(58) Field of Classification Search .................. 353/52, 353/57–61; 348/748
See application file for complete search history.

(56) References Cited

U.S. PATENT DOCUMENTS

| 6,558,003 | B2 * | 5/2003 | Mihara ......................... 353/52 |
| 6,643,129 | B2 * | 11/2003 | Fujiwara ...................... 361/687 |
| 6,844,993 | B2 * | 1/2005 | Fujimori et al. ............. 359/820 |
| 6,857,749 | B2 * | 2/2005 | Fuse et al. ..................... 353/57 |
| 6,906,840 | B1 * | 6/2005 | Fujimori et al. ............. 359/237 |
| 7,073,912 | B2 * | 7/2006 | Yanagisawa et al. .......... 353/61 |
| 7,175,282 | B2 * | 2/2007 | Jung et al. ..................... 353/47 |
| 2002/0131023 | A1 * | 9/2002 | Shiraishi et al. ............... 353/57 |
| 2005/0117295 | A1 * | 6/2005 | Patel ........................... 361/697 |

FOREIGN PATENT DOCUMENTS

JP A-11-237690 8/1999

* cited by examiner

*Primary Examiner*—Diane I Lee
*Assistant Examiner*—Magda Cruz
(74) *Attorney, Agent, or Firm*—Oliff & Berridge, PLC

(57) ABSTRACT

A projector which projects an image, includes: an optical configuration section which includes: a light source which emits light; an optical conversion section which includes a conversion section which converts the light emitted from the light source into an image based on image data; and a projection lens which enlarges and projects the image converted by the optical conversion section; a circuit configuration section which operates the optical configuration section; a housing which is included in the exterior of the projector and includes, in its outer surface portion, a heat releasing section; and a heat transfer member which transfers, to the housing, heat emitted by heat emitting components of the circuit configuration section and the optical configuration section.

8 Claims, 3 Drawing Sheets

PROJECTOR

BACKGROUND

1. Technical Field

The entire disclosure of Japanese Patent Application Nos: 2005-58518, filed Mar. 3, 2005 and 2005-338275, filed Nov. 24, 2005 are expressly incorporated by reference herein.

The present invention relates to a projector which projects an image, and more particularly to the cooling structure of the projector.

2. Related Art

In the existing structure of cooling heat occurring in a projector, as disclosed in JP-A-11-237690, the following configuration has hitherto been known. That is, an opening is made in part of the bottom surface of a resin-based optical chassis located inside a housing. An auxiliary heat release plate is secured to the opening. The heat release plate of a power source base plate is abutted and secured to the auxiliary heat release plate. By so doing, as heat is transferred from the heat release plate to the auxiliary heat release plate, the heat is released in fresh air expelled by fans equipped in a fresh air inlet and an exhaust outlet, respectively, in the resin-based optical chassis.

However, the configuration disclosed in JP-A-11-237690 has the following problem. That is, the resin-based optical chassis is adopted, and the resin-based optical chassis is set up inside the housing. Besides, an opening is made in part of the bottom surface of the resin-based optical chassis, and the auxiliary heat release plate has a shape to allow only an attachment of the size of the opening which receives it. For such reasons and others, heat transferred by the auxiliary heat release plate is difficult to release in the air expelled by the fan, which lowers the cooling efficiency.

SUMMARY

An advantage of some aspects of the invention is to provide a projector with a higher cooling efficiency.

According to an aspect of the invention, a projector comprises: an optical configuration section, a circuit configuration section, a housing, and a heat transfer member. The optical configuration section includes: a light source which emits light; an optical conversion section which includes a conversion section which converts the light emitted from the light source into an image based on image data; and a projection lens which enlarges and projects the image converted by the optical conversion section. The circuit configuration section operates the optical configuration section. The housing is included in the exterior of the projector and includes, in its outer surface portion, a heat releasing section. The heat transfer member transfers, to the housing, heat emitted by heat emitting components of the circuit configuration section and the optical configuration section.

According to such a projector, the heat from the heat emitting components of the circuit configuration section or the optical configuration section is transferred to the housing by the heat transfer member. Thereafter, the housing, which is included in the exterior of the projector and includes in its outer surface section a heat release section, releases the transferred heat into the outside air from the heat release section. Thus the heat releasing efficiency can be increased. It follows that it is thus possible to improve the efficiency of cooling the heat emitting components.

In a projector according to the aspect, it is preferable that there be included: a cooling fan which, being set up in the vicinity of the heat releasing section in the housing, expels air to the heat releasing section; and a cover member which, covering the heat releasing section and being attached to the housing, allows the air expelled from the cooling fan to flow.

According to such a projector, the heat releasing section being covered by the cover member, air flows, expelled from the cooling fan. It thereby becomes possible to further improve the heat releasing efficiency and thus to further improve the efficiency of cooling the heat emitting components.

In a projector according to the aspect, it is preferable that the heat releasing section be formed with fins.

According to such a projector, the heat releasing section is formed with fins. Therefore, the heat releasing area is increased, so that the heat releasing efficiency can be further improved. It follows that it is thus possible to further improve the efficiency of cooling the heat emitting components.

In a projector according to the aspect, it is preferable that a cooling spatial region formed by the housing and the cover member, and a body interior spatial region in the interior of the projector, which houses the circuit configuration section and the optical configuration section, are separate from one another.

According to such a projector, heat from the heat emitting components is released in the cooling spatial region for cooling. As described above, it thereby becomes possible to increase cooling efficiency. Furthermore, the cooling spatial region and the body interior spatial region are separate from one another, so that dust, which is taken in with the fresh air expelled from the cooling fan and flows through the cooling spatial region, is prevented from entering the body interior spatial region. This prevents dust from sticking to the circuit configuration section and the optical configuration section housed in the body interior section sector, which prevents the shadow of the dust from being reflected in the projected image. It follows that both the efficiency of cooling the heat emitting components and the quality of the projected image can thus be improved.

In a projector according to the aspect, it is preferable that the fins be formed at least in the upper surface or side surface of the projector.

According to such a projector, the fins are formed in a position which is easily affected by fresh air circulating, which therefore further improves heat releasing efficiency. It follows that the efficiency of cooling the heat emitting components can thus be further improved.

In a projector according to the aspect, it is preferable that the cooling fan be positioned level with the fins.

According to such a projector, the cooling fan can perform cooling while being positioned level with the fins. Therefore, the thickness of the projector can thus be decreased, as compared with the case in which the fan and the fins are stacked in layers.

In a projector according to the aspect, it is preferable that the fins have a spatial region formed radiating outward relative to the cooling fan.

According to such a projector, the fins are formed radiating outward relative to the fan. The air, which diffuses after being expelled into the radiating spatial region from the fan, can thereby be caused to flow efficiently between the fins. In this way, with the heat releasing efficiency thus improved by the fins being able to efficiently release heat while receiving air from the fan, it is possible to further improve the efficiency of cooling the heat emitting components.

In a projector according to the aspect, it is preferable that the cover member be configured of a member having heat conductivity.

According to such a projector, with heat being transferred from the housing to the cover member to which it is attached, the heat thus transferred to the cover member is released into the air from the outer surface side of the cover member and the cooling spatial region configuring surface, thereby further improving heat releasing efficiency. It follows that the efficiency of cooling the heat emitting components can thus be further improved.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment of the invention will hereafter be described with reference to the drawings.

Embodiment

Figure 1A:
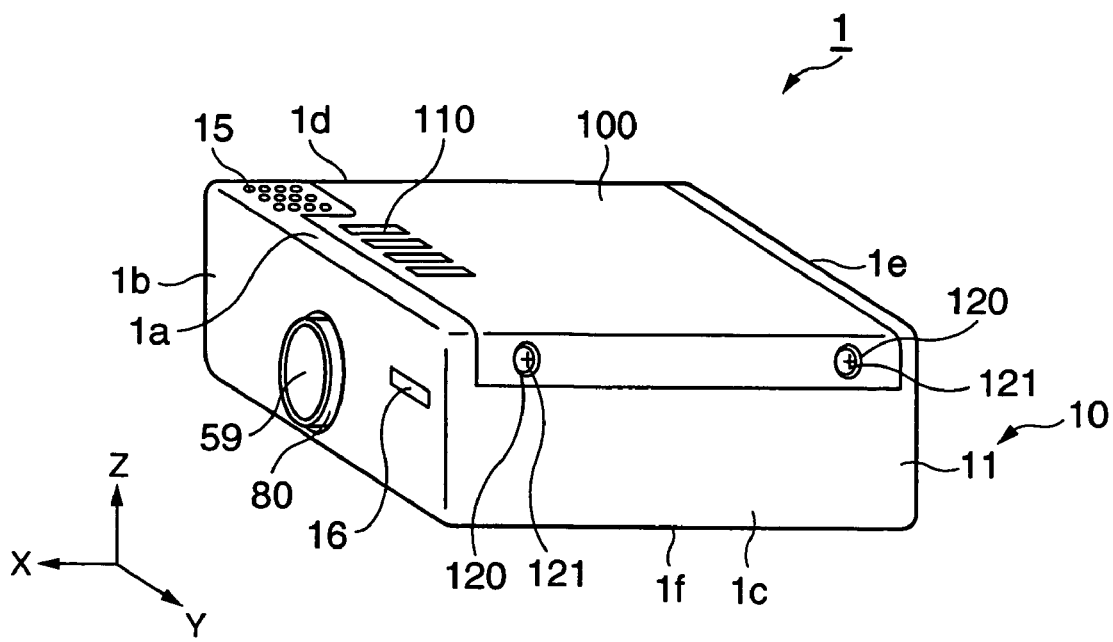
FIGS. 1A and 1B are schematic perspective views of a projector according to an embodiment of the invention, FIG. 1A being a perspective view of a state in which a cover member has been attached, and FIG. 1B being a perspective view of a state in which the cover member has been removed.
Figure 1B:
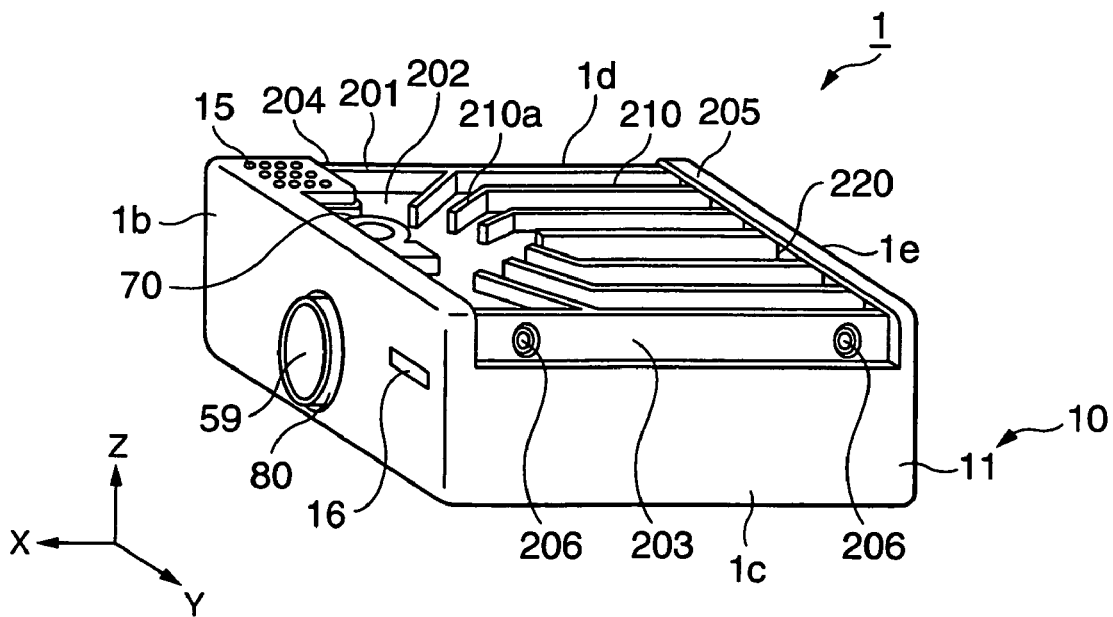

FIGS. 1A and 1B are schematic perspective views of a projector according to the embodiment of the invention, FIG. 1A being a perspective view of a state in which a cover member has been affixed, and FIG. 1B being a perspective view of a state in which the cover member has been removed. The external configuration of a projector 1 will be generally described with reference to FIGS. 1A and 1B.

To describe the configuration, a total of six surfaces, which are included in the exterior surface of the projector 1, are shown as an upper surface section 1a, a front surface section 1b, a left side surface section 1c, a right side surface section 1d, a back surface section 1e, and a bottom surface section 1f.

As shown in FIG. 1A, the projector 1 includes a substantially rectangular parallelepiped housing 10, which is included in the exterior of the projector 1, and a cover member 100, which covers roughly the entire upper surface section 1a of the projector 1.

Figure 3:
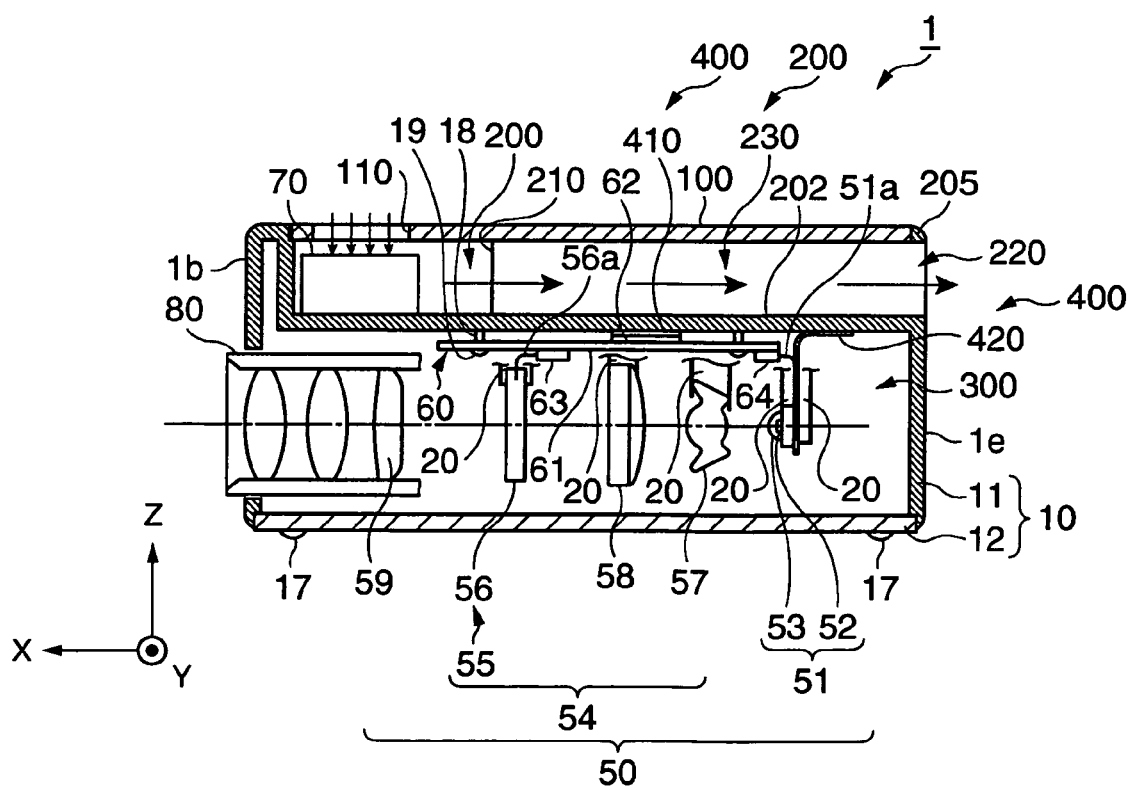
FIG. 3 is a sectional view taken along the line A-A shown in FIG. 2.

The housing 10 includes an upper casing 11 and a lower casing 12 (shown in FIG. 3). The upper casing 11 has heat conductivity and is formed of an aluminum alloy of a high heat conductivity. The lower casing 12, which similarly has heat conductivity and is formed of an aluminum alloy of a high heat conductivity, is included in the exterior of the bottom surface section 1f of the projector 1. The upper casing 11 and the lower casing 12 are secured with a screw.

As shown in FIG. 1B, in the upper surface section 1a of the housing 10, a cover member mounting surface 201, which is a depression of the thickness of the cover member 100, for mounting the cover member 100, is formed in the upper casing 11. Additionally, a cooling spatial region configuring surface 202, formed as a depressed tray, is configured in the upper surface section 1a. A plurality of projecting fins 210, which act as the heat releasing section, are formed in the cooling spatial region configuring surface 202. In addition, in the cooling spatial region configuring surface 202, in the direction of the front surface section 1b of the housing 10, a cooling fan 70 is fixedly set, taking in and expelling fresh air into a to-be-described cooling spatial region 200 (shown in FIG. 3). Furthermore, the height of the projection of the fins 210 is set to be the same height as the cover member mounting surface 201.

In the upper surface section 1a, an announcement sounding hole 15, through which an announcement sound output from a speaker 37 (shown in FIG. 4) disposed inside the projector 1 is sounded, is formed beside the cooling spatial region configuring surface 202.

In the front surface section 1b, a projection lens 59 and the tip of a projection lens holding section 80 for holding the projection lens 59 extrude from the housing 10. Furthermore, a remote light reception section 16 is set up to receive a signal from a remote control (hereafter called a remote) 530, thus controlling the operation of the projector 1.

Cover member attachment surfaces 203 and 204, which are depressions for attaching the cover member 100, are formed along the upper section of the left side surface section 1c and the right side surface section 1d. Screw fixation/support sections 206, which have sets of a depression with a round hole, two sets in each surface, respectively, are formed in the cover member attachment surfaces 203 and 204.

In the back surface section 1e is formed an exhaust outlet 220, which is enclosed by an exhaust outlet upper surface section 205, the fins 210, and the cooling spatial region configuring surface 202 which are configured in the upper casing 11. Additionally, in the back surface section 1e are disposed a connector (not shown) which is included in a to-be-described power source connector 42 (shown in FIG. 4) and is connected to a plug 520 (shown in FIG. 4) of a power source adapter (not shown) provided separately from the projector 1, and the like.

Legs 17 (shown in FIG. 3) for supporting the projector 1 are set up in the bottom surface section 1f of the housing 10.

The cover member 100, having heat conductivity, is formed from a sheet of an aluminum alloy, having a high heat conductivity, into a cross-sectional U-shape. Additionally, in the cover member 100, a plurality of slit-like holes are formed at the positions opposite the cooling fans 70, thus configuring a fresh air inlet 110. Furthermore, screw holes 120, having sets of a depression with a round hole, which correspond to the screw fixation/support sections 206, respectively, are formed in the side surface sections of the cover member 100.

The cover member 100, thus configured, is mounted on the cover member mounting surface 201 so as to cover the fins 210 formed in the upper surface section 1a of the housing 10, then screwed to the screw fixation/support sections 206 with screws 121 via the screw holes 120, and is thereby fixed to the upper casing 11.

The cover member 100 is fixed to the upper casing 11, and is thereby set not to project from but to be approximately flush with the outer surfaces of the upper surface section 1a, the left side surface section 1c, and the right side surface section 1d of the upper casing 11, thus providing an exterior surface which produces a impression of unity in the projector 1.

Figure 2:
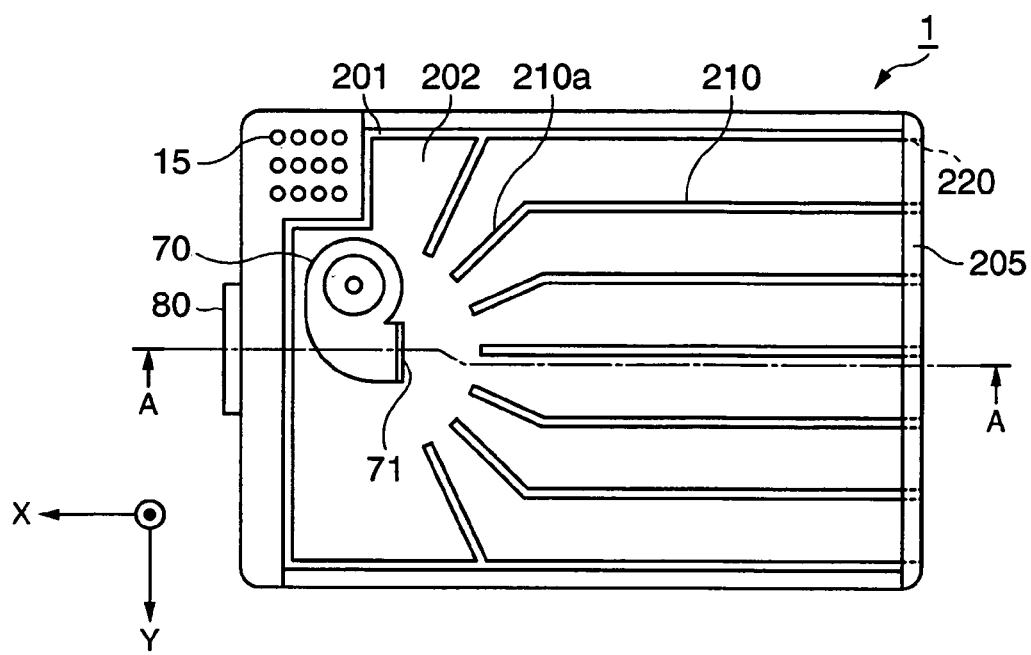
FIG. 2 is a plan view in the state in which the cover member has been removed.

FIG. 2 is a plan view in the state in which the cover member has been removed. The configuration and operation of the fins 210 will be described using FIG. 2.

As shown in FIG. 2, the fins 210, formed on the cooling spatial region configuring surface 202, each have a radial fin section 210a which provides a region which is formed to radiate out relative to the cooling fan 70 (specifically, relative to a delivery opening 71 of the cooling fan 70). In addition, the cover member fixation/support surfaces 203 and 204 also function as part of the fins 210. The cooling fan 70 is set up level (in non-stacked relation) with the fins 210. Air expelled from the cooling fan 70 thus diffuses in a radial manner, and the radial fin section 210a allows the diffusing air to flow efficiently between the adjacent fins 210.

FIG. 3 is a section view taken along the line A-A shown in FIG. 2. The configuration and operation of the projector 1 will be described using FIG. 3.

The configuration of spatial regions inside the projector 1, which are enclosed by the housing 10 and the cover member 100, will be described using FIG. 3.

As shown in FIG. 3, the projector 1 includes a body interior spatial region 300 which provides a spatial region (spatial region inside the projector 1) enclosed by the upper casing 11 and the lower casing 12, and a cooling spatial region 200 which provides a spatial region enclosed by the cooling spatial region configuring surface 202, configured in the upper casing 11, and the cover member 100. The body interior spatial region 300 and the cooling spatial region 200 are configured to be almost completely separate from one another. This prevents the air flowing in the cooling spatial region 200 from entering the body interior spatial region 300.

The body interior spatial region 300 is the region which houses a to-be-described optical configuration section 50 which is included in the optical system of the projector 1, a circuit unit 60 which acts as the circuit configuration section included in a circuitry system, and the like. In addition, the cooling spatial region 200 is the region in which the fins 210 are formed on and the cooling fan 70 is set up on the aforementioned cooling spatial region configuring surface 202, thus releasing the heat transferred from the optical configuration section 50 and the circuit unit 60 in the body interior spatial region 300.

In order to drive the cooling fan 70 set up on the cooling spatial region configuring surface 202, a cable (not shown) to be connected to the circuit unit 60 housed in the body interior spatial region 300, and the like, are connected thereto through a hole which is made in the cooling spatial region configuring surface 202. This hole also prevents the air flowing in the cooling spatial region 200 from entering the body interior spatial region 300 by a sealing member (not shown).

Additionally, in the upper casing 11 and the lower casing 12 which are included in the body interior spatial region 300, the heat emitted as radiant heat from the optical configuration section 50 or the circuit unit 60 is transferred to, and is then released into the outside air from the outer surfaces of the upper casing 11 and the lower casing 12, which are in contact with the outside air, thus cooling the heat transferred.

First, the configuration of the optical configuration section 50 will be described using FIG. 3.

The optical configuration section 50, which is a section included in the optical system of the projector 1, includes a light source 51, an optical conversion section 54, and the projection lens 59. The light source 51 includes an LED (Light Emitting Diode) light source 52, which acts as the light emitting source, and a collective lens 53. The optical conversion section 54 includes a collimator lens 57, an extension lens 58, and a liquid crystal light valve 56 which acts as a conversion section 55.

The optical configuration section 50 is located in the planar center and the cross-sectional center of the housing 10. The light source 51 is arranged on the back surface section 1e side, and the optical conversion section 54 and the projection lens 59 are arranged in front thereof in the order named. Part of a projection lens holding section 80, which holds and secures the projection lens 59, extrudes from the front surface section 1b. In the optical conversion section 54, in front of the light source 51 are arranged the collimator lens 57, the extension lens 58, the liquid crystal light valve 56 which acts as the conversion section 55, in the order named. The optical configuration section 50 is arranged in a straight line in the aforementioned order of arrangement.

The light source 51, having a light source cable 51a, is connected to the circuit unit 60 to be described later, while the liquid crystal light valve 56, having a light valve cable 56a, is connected to the circuit unit 60 to be described later.

Next, the operation of each optical component will be described.

The LED light source 52, which is included in the light source 51, emits white light (which includes light of all colors) based on a drive signal from an LED control section 39 (shown in FIG. 4) which is transmitted via the light source cable 51a.

The collective lens 53 efficiently allows the light emitted from the LED light source 52 to emerge forward. The collimator lens 57 converts the light emitted from the light source 51 into a parallel beam and emits the parallel beam. The extension lens 58 extends the parallel beam emitted from the collimator lens 57 in response to the size of a predetermined incident light region (not shown) of the liquid crystal light valve 56, and emits the extended beam.

The liquid crystal light valve 56, which uses a transmissive liquid crystal panel in this embodiment, is driven based on a drive signal from an LCD drive section 34 (shown in FIG. 4), which is transmitted via the light valve cable 56a, to modulate the light emitted from the extension lens 58 and to convert the modulated light into an image. The liquid crystal light valve 56 is not limited to the transmissive liquid crystal panel, and may also use a reflective liquid crystal panel, a digital micromirror device, or the like.

The projection lens 59, including a plurality of kinds of lenses, enlarges the image modulated and generated by the liquid crystal light valve 56, and emits the enlarged image to the outside of the projector 1.

With the aforementioned configuration and operation of the optical configuration section 50, the projector 1 enlarges and projects the image onto a projection surface, such as a screen 510 (shown in FIG. 4), which is set up outside the projector 1.

A fixation section 20 is formed on the inner surface side of the upper casing 11 which is included in the cooling spatial region configuring surface 202. The projection lens holding member 80, which holds and secures the optical conversion section 54 and the projection lens 59, is housed in and fixed to the fixation section 20 while maintaining a predetermined positioning.

The configuration of the circuit unit 60 will now be described.

The circuit unit 60, which is a circuit configuration section included in the circuitry system of the projector 1, mounts, on a circuit board 61, components included in each circuit section of the circuit block of the projector 1 to be described later. The circuit unit 60, formed with a circuit unit fixation projection 18 on the inner surface side of the upper casing 11 included in the cooling spatial region configuring surface 202, is fixed to the upper casing 11 with a screw 19 through the circuit unit fixation projection 18.

The circuit unit 60 has mounted on top of the circuit board 61 the following components which are included in each circuit section: an MPU (Micro Processing Unit) 62, the connector which is included in the power source connector 42 (shown in FIG. 4), the speaker 37 (shown in FIG. 4), the light valve cable connector 63 which provides a connection to the light valve cable 56a, the light source cable connector 64 which provides a connection to the light source cable 51a for driving the light source 51, and the like. The other components are omitted from illustration.

Heat in the body interior spatial region 300 and the cooling spatial region 200 will now be described.

The MPU 62 provides an image processing related component which emits the most heat in the circuit unit 62 when the projector 1 is driven, and a heat conductive sheet 410, which acts as a heat transfer member 400, is placed on the MPU 62 so as to cover the upper surface of the MPU 62. The heat conductive sheet 410 is sandwiched between the MPU 62 and the upper casing 11 by fixing the circuit unit 60 to the upper casing 11. With this configuration, the heat conductive sheet 410 is connected to the inner surface of the upper casing 11 which provides the surface opposite the cooling spatial region configuring surface 202. The heat conductive sheet 410 thus transfers the heat, which is emitted by the MPU 62, to the upper casing 11 which is included in the cooling spatial region configuring surface 202.

In the light source 51 which emits the most heat in the optical configuration section 50 when the projector 1 is driven, a heat conductive sheet 420, which acts as the heat transfer member 400 made mainly of flexible aluminum, is attached, in a shape corresponding to the light source cable 51a of the light source 51, to the light source cable 51a. With this configuration, the heat conductive sheet 420 is connected to the inner surface of the upper casing 11 which provides the surface opposite the cooling spatial region configuring surface 202. The heat conductive sheet 420 transfers the heat, which is emitted by the light source 51, to the upper casing 11 which is included in the cooling spatial region configuring surface 202.

The heat conductive sheets 410 and 420 transfer the heat, which is emitted by the MPU 62 and the light source 51, to the inner surface of the upper casing 11 which is included in the cooling spatial region configuring surface 202, and thereby also to the cooling spatial region configuring surface 202 which is included in the cooling spatial region 200.

The configuration of the cooling spatial region 200 will now be described in detail.

As described above, the cooling spatial region 200 is a spatial region enclosed by the cooling spatial region configuring surface 202, which is configured in the upper casing 11, and the cover member 100. In addition, the fins 210 are formed on and the cooling fan 70 is set up on the cooling spatial region configuring surface 202. The cooling spatial region 200 is enclosed by the cooling spatial region configuring surface 202, the fins 210, and the cover member 100, which thereby provides the state in which the fins 210 partition the cooling spatial region 200, thus configuring a flow path 230. Additionally, in the back surface section 1e, the exhaust outlet 220 is configured in the upper casing 11, enclosed by the cooling spatial region configuring surface 202, the fins 210, and the exhaust outlet upper surface portion 205.

The operation and heat of the cooling fan 70 in the cooling spatial region 200 will now be described in detail.

As the cooling fan 70 operates, the cooling fan 70 takes in fresh air from the fresh air inlet 110 which is formed in the cover member 100, and radially expels the air into the cooling spatial region 200 from the delivery opening 71.

The radial fin section 210a of each fin 210 causes the air, which has been radially expelled from the cooling fan 70, to flow between the opposing fins 210 (to flow through the flow path 230). On this occasion, the air flowing through the flow path 230 releases the heat, which has been transferred to the upper casing 11 which is included in the cooling spatial region configuring surface 22, from the cooling spatial region configuring surface 202 and the fins 210. The released heat is discharged, together with the flowing air, from the exhaust outlet 220 to the outside of the projector 1. The air flows in the arrowed direction shown in FIG. 3.

By repeating the cycle of the aforementioned air flow, the heat, which has been transferred to the upper casing 11, is released by the cooling spatial region configuring surface 202 and the fins 210. The MPU 62 and the light source 51 are thereby cooled via the heat conductive sheets 410 and 420 which are connected to the inner surface side of the upper casing 11 which is included in the cooling spatial region configuring surface 202.

As described above, the body interior spatial region 300 and the cooling spatial region 200 are structured to be almost completely separate from one another. Therefore, this prevents the air flowing through the cooling spatial region 200 from leaking and flowing into the body interior spatial region 300.

Figure 4:
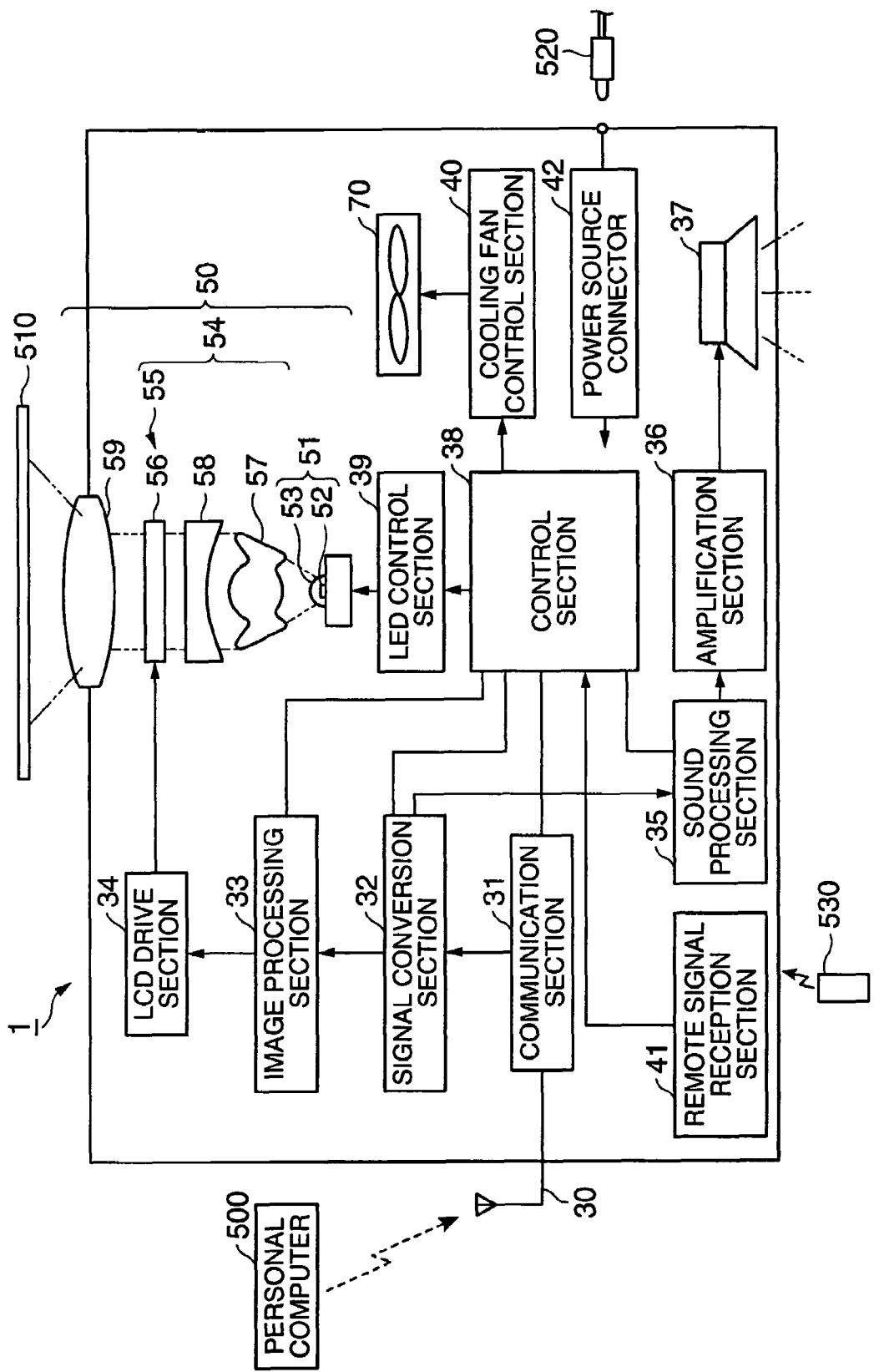
FIG. 4 is a block diagram showing the circuit configuration of the projector.

FIG. 4 is a block diagram showing the circuit configuration of the projector. The circuit configuration and operation of the projector 1 will be described using FIG. 4.

The projector 1 is linked by wireless to a personal computer 500. The projector 1 includes an antenna 30, a communication section 31, a signal conversion section 32, an image processing section 33, the LCD (Liquid Crystal Display) drive section 34, the optical configuration section 50, the LED (Light Emitting Diode) control section 39, a sound processing section 35, an amplification section 36, the speaker 37, a cooling control section 40, the cooling fan 70, a remote signal reception section 41 for receiving a signal from the remote 530, a control section 38 for exerting overall control over the entire operation of the power source connector 42 and the projector 1, and the like.

The operation of each circuit section of the projector 1 will be described.

The projector 1 receives encoded image data (static image data and moving image data) and sound data from the personal computer 500 through the antenna 30 and the communication section 31. The image data and the sound data, having been received, are decoded by the signal conversion section 32, and the image data decoded is sent to the image processing section 33, while the sound data decoded is sent to the sound processing section 35.

The image processing section 33 performs frame rate conversion, scaling, and the like on the image data received from the signal conversion section 32. In addition, the image processing section 33 also performs various kinds of image corrections, such as a brightness adjustment, a contrast adjustment, and a gamma correction, on the image data. The image data thus processed is sent to the LCD drive section 34 as a projection image signal. The LCD drive section 34 drives the liquid crystal light valve 56 based on the projection image signal received from the image processing section 33.

The sound processing section 35 converts the sound data, which is a digital signal received from the signal conversion section 32, into an analog signal, causes the amplification section 36 to amplify the analog signal, and causes the speaker 37 to sound an announcement, as a sound, via the announcement sounding hole 15.

The LED control section 39 exerts the brightness control of the LED light source 52 based on a signal from the control section 38. Specifically, a drive frequency and a duty ratio, which are used to drive the LED light source 52, are varied in response to a scene of an image. The following control is thereby exerted: in a bright scene, the drive frequency is increased or the "ON" time period of the duty ratio is lengthened, thereby causing the LED light source 52 to emit bright light. In a dark scene, conversely, the drive frequency is reduced or the "ON" time period of the duty ratio is shortened, thereby suppressing the light emission of the LED light source 52 and thus causing the LED light source 52 to emit dim light. The LED light source 52 emits white light (which includes light of all colors).

The cooling fan control section 40 controls and drives the cooling fan 70 based on a signal from the control section 38.

The remote signal reception section 41 receives a signal, which has been transmitted from the remote 530, via the remote light reception section 16 (shown in FIG. 1), and sends the received signal to the control section 38. The remote 530 performs communication using infrared light.

The control section 38 exerts overall control over the entire operation of the projector 1 including the optical configuration section 50 and the circuit unit 60 which acts as the circuit configuration section.

Power for driving the projector 1 is supplied via the power source adapter (not shown) equipped separately from the projector 1. The projector 1 is equipped with the power source connector 42, thus providing a connection to the plug 520 of the power source adapter.

The following effects can be obtained according to the aforementioned embodiment.

1. According to this embodiment, the upper casing 11, being included in the housing 10 and having heat conductivity, is formed of an aluminum alloy of a high heat conductivity, and includes the fins 210 formed on the cooling spatial region configuring surface 202. Additionally, the heat of the MPU 62 which emits heat in the circuit unit 60 and of the light source 51 which emits heat in the optical configuration section 50 is transferred by the heat conductive sheets 410 and 420 to the inner surface of the upper casing 11 which is included in the cooling spatial region configuring surface 202. With this configuration, the heat transferred is efficiently released into the outside air from the outer surface of the upper casing 11 and the fins 210, so that heat releasing efficiency can be increased. Accordingly, this makes it possible to increase the efficiency of cooling the components, such as the MPU 62 and the light source 51 which emit heat.

2. According to this embodiment, the fins 210 are formed on the cooling spatial region configuring surface 202 configured in the upper casing 11, and the cooling fan 70 is set up in the vicinity of the fins 210. Besides, the cover member 100 is set up which covers the fins 210, is fixed to the upper casing 11, and causes the air, which is expelled from the cooling fan 70, to flow. The heat releasing efficiency in the fins 210 is thereby further increased, which makes it possible to further increase the efficiency of cooling the components, such as the MPU 62 and the light source 51 which emit heat.

3. According to this embodiment, the projector 1 includes the body interior spatial region 300 which provides the spatial region (the spatial region inside the projector 1) enclosed by the upper casing 11 and the lower casing 12, and the cooling spatial region 200 which provides the spatial region enclosed by the cooling spatial region configuring surface 202 configured in the upper casing 11 and the cover member 100. Besides, the body interior spatial region 300 and the cooling spatial region 200 are structured to be almost completely separate from one another. This makes it possible not only to release the heat of and cool the components which emit heat in the cooling spatial region 200 and thereby increase cooling efficiency as described above, but to prevent the air, which flows through the cooling spatial region 200, from flowing into the body interior spatial region 300. Therefore, dust, which is sucked in from the outside air by the air expelled from the cooling fan 70, flows through the cooling spatial region 200 but will not flow into the body interior spatial region 300. Accordingly, this can prevent the dust from adhering to the optical configuration section 50 housed in the body interior spatial region 300 and the circuit unit 60 which acts as the circuit configuration section. In particular, when the dust has adhered to the conversion section which converts the light from the light source into an image, transmitted light is blocked by the dust, the blocked region is projected as a shadow when the image is projected onto the projection surface by the projection lens. However, such a problem can be prevented, which makes it possible to improve the quality of the image projected.

4. According to this embodiment, the cooling fan 70 is set up level with the fins 210, in the vicinity of the fins 210 formed on the cooling spatial region configuring surface 202. The cooling fan 70 thus performs cooling. Therefore, the thickness of the projector 1 can be reduced as compared with the case in which the cooling fan 70 and the fins 210 are stacked in layers.

5. According to this embodiment, the adjacent fins 210 formed in the cooling spatial region configuring surface 202 have their respective radial fin sections 210a which provide a region formed to radiate out relative to the cooling fan 70 (particularly, relative to the delivery opening 71 of the cooling fan 70). The air, which is radially expelled and diffused from the cooling fan 70, can thereby flow efficiently between the adjacent fins 210 through their respective radial fin sections 210a which are formed in a radiating manner. Accordingly, the fins 210 can efficiently receive and release the air expelled from the cooling fan 70, thus improving releasing efficiency, thereby making it possible to further increase the efficiency of cooling the components such as the MPU 62 and the light source 51 which emit heat.

6 According to this embodiment, the cover member 100, which has heat conductivity, is formed of an aluminum alloy of a high heat conductivity, and is fixed to the upper casing 11. The heat transferred to the cooling spatial region configuring surface 202 can thereby also be transferred to the cover member 100. Therefore, the heat is released from the outer surface side of the cover member 100 and from the surface which configures the cooling spatial region 200, thereby increasing heat releasing efficiency. Accordingly, the efficiency of cooling the heat emitting components is further increased.

The invention is not limited to the embodiment described above, and various modifications and improvements can be made thereto. Modified examples are described below.

MODIFIED EXAMPLE 1

In the aforementioned embodiment, the fins 210 are formed on the upper surface of the upper casing 11 which corresponds to the upper surface section 1a of the projector 1. However, the configuration is not limited thereto, and the fins may be formed in a side surface of the housing 10 (the upper casing 11). The fins are thus formed in a place likely to be affected by fresh air circulating, thereby increasing heat releasing efficiency. Accordingly, the efficiency of cooling the heat emitting components can be further increased.

MODIFIED EXAMPLE 2

In the aforementioned embodiment, the upper casing 11 and the lower casing 12 which is included in the housing 10, and the cover member 100 are formed of an aluminum alloy which is a heat conductive member and has a high heat conductivity. However, the configuration is not limited thereto, and to have heat conductivity, formation of a metal which has a high heat conductivity will suffice. For example, the upper casing 11, the lower casing 12, and the cover member 100 may be formed of a metal such as a copper alloy or a magnesium alloy, thus making it possible to obtain the same effect as that of the aforementioned embodiment.

MODIFIED EXAMPLE 3

In the aforementioned embodiment, the cover member 100, which has heat conductivity, is formed of an aluminum alloy which has a high heat conductivity, and transfers and releases the heat from the upper casing 11, thereby increasing the efficiency of cooling the heat emitting components. However, when the heat emitting components can be cooled even if the cover member 100 has no heat conductivity, the material which forms the cover member 100 may be configured of a material which has no heat conductivity, for example, a plastic material. This allows for an increase in the degree of freedom in selecting the material which configures the cover member 100 and the color thereof.

MODIFIED EXAMPLE 4

In the aforementioned embodiment, the projector 1 has the structure of cooling mainly the MPU 62, being the image processing related component which emits the most heat in the circuit unit 60 which acts as the circuit configuration section, and the light source 51 which emits the most heat in the optical configuration section 50. However, the structure is not limited thereto, and a component which needs to be cooled may be configured in the same manner as in the aforementioned embodiment, using the heat transfer member 400 for transferring heat to the cooling spatial region 200, thereby making it possible to increase the efficiency of cooling the component.

MODIFIED EXAMPLE 5

The configuration method of the housing 10, the configuration method of the cooling spatial region 200, the configuration method of the body interior spatial region 300, the shape of the cooling spatial region configuring surface 202 and the configuration position thereof, the shape and number of the fins 210, the shape and fixation method of the cover member 100, the configuration method of the fresh air inlet 110 and the exhaust outlet 220, the number and positioning of the cooling fan 70, and the like in the aforementioned embodiment are not limited to the aforementioned embodiment, but may be modified or improved as appropriate without departing from the spirit of the invention.

MODIFIED EXAMPLE 6

The projector 1 in the aforementioned embodiment is a projector using a transmissive liquid crystal system. However, the projector 1 is not limited thereto, and may be a projector which adopts a DLP (trademark) (Digital Light Processing) system, an LCOS (Liquid Crystal On Silicon) system which is a reflective liquid crystal system, and the like.

What is claimed is:

1. A projector which projects an image, comprising:
    an optical configuration section which includes:
        a light source which emits light;
        an optical conversion section which includes a conversion section which converts the light emitted from the light source into an image based on image data; and
        a projection lens which enlarges and projects the image converted by the optical conversion section;
    a circuit configuration section which operates the optical configuration section;
    a housing which is included in the exterior of the projector and includes, in its outer surface portion, a heat releasing section; and
    a heat transfer member which transfers, to the housing, heat emitted by heat emitting components of the circuit configuration section and the optical configuration section,
    a cooling spatial region which is apart from a body interior spatial region, in which heat source parts of the light source and the circuit configuration section are disposed, and
    a cooling fan which expels air to the heat releasing section, the cooling fan being disposed in the cooling spatial region.

2. A projector according to claim 1, further comprising:
    a cover member which, covering the heat releasing section and being attached to the housing, allows air expelled from the cooling fan to flow,
    the cooling fan being set up in a vicinity of the heart releasing section.

3. A projector according to claim 2, the cooling spatial region being formed by the housing and the cover member, and the body interior spatial region in an interior of the projector and the optical configuration section, being separate from one another.

4. A projector according to claim 2, the cover member being configured of a member having heat conductivity.

5. A projector according to claim 1 the heat releasing section is being formed with fins.

6. A projector according to claim 5, the fins being formed at least in the upper surface or side surface of the projector.

7. A projector according to claim 5 the cooling fan being positioned level with the fins.

8. A projector according to claim 5, the fins having a spatial region formed radiating outward relative to the cooling fan.

* * * * *